Jan. 24, 1967  C. F. HAUTAU  3,299,681
PROGRAM CONTROLLED TUBE BENDER
Filed March 22, 1960  2 Sheets-Sheet 1

INVENTOR.
CHARLES F. HAUTAU
BY Allen M Kraus
ATTORNEY

Jan. 24, 1967  C. F. HAUTAU  3,299,681
PROGRAM CONTROLLED TUBE BENDER
Filed March 22, 1960  2 Sheets-Sheet 2
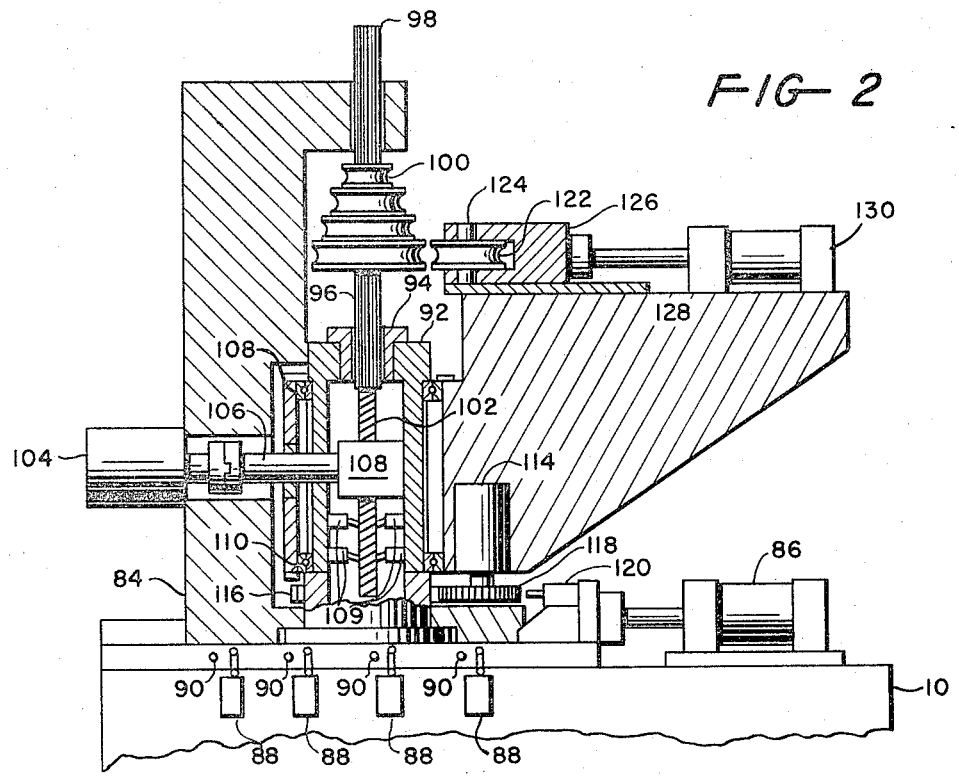
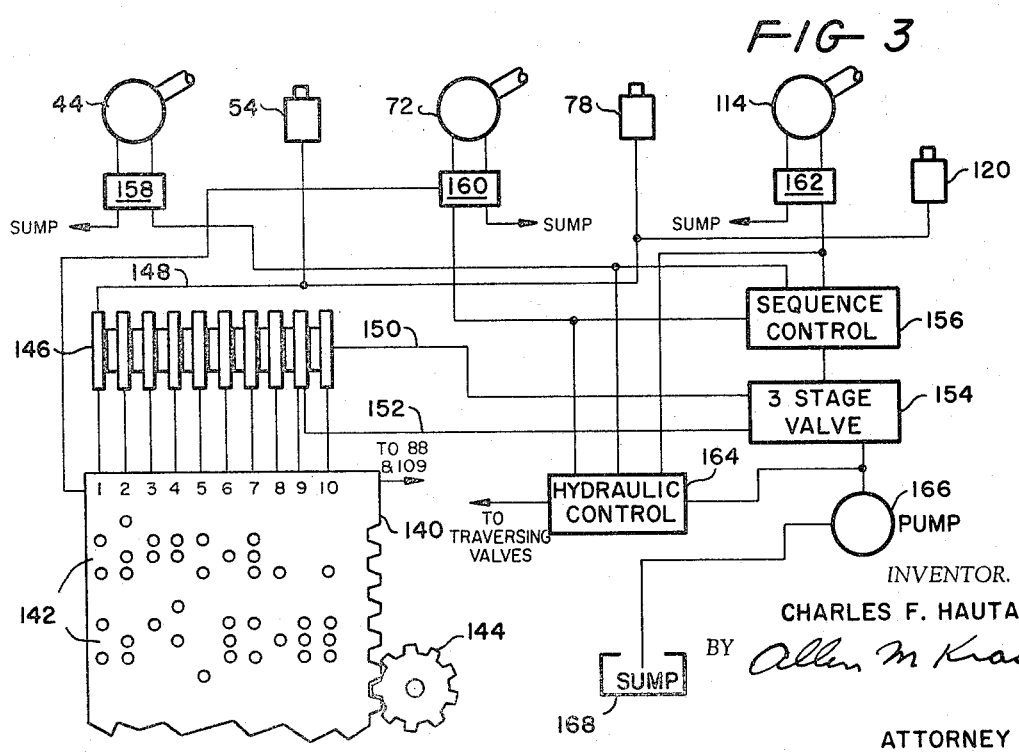
INVENTOR.
CHARLES F. HAUTAU
BY Allen M Krass
ATTORNEY 
United States Patent Office 3,299,681
Patented Jan. 24, 1967

3,299,681
PROGRAM CONTROLLED TUBE BENDER
Charles F. Hautau, Oxford, Ohio, assignor, by mesne assignments, to Baldwin-Lima-Hamilton Corporation, Philadelphia, Pa., a corporation of Delaware
Filed Mar. 22, 1960, Ser. No. 16,846
15 Claims. (Cl. 72—7)

This application is a continuation-in-part of application Serial No. 771,576 and now abandoned, which was filed November 3, 1958.

This invention relates to a machine for bending metal tubing and more particularly to such a machine which is adjustable to different sizes and shapes of bends and which may be controlled so as to automatically form a sequence of bends of various configurations along a length of tubing.

Articles such as tailpipes for automobiles and furniture frames which consist of bent metal tubing have heretofore been formed by initially making a first bend in one machine, then manually removing the tube to another machine where a second bend is made, and continuing in this manner until the article is completely shaped. In such operations the direct labor applied in forming the part has been a substantial percentage of the cost of the finished product. The present invention contemplates forming a series of bends in metal tubing or rod in a single machine which is controlled so as to perform a sequence of bends of various configurations along the length of the part. In such a machine the information necessary for the performance of the various bends may be introduced in a coded manner previous to the initiation of the first operation.

In making a series of bends along a length of tubing it is generally necessary to control four parameters for each bend. These are the position of the bend along the length of the pipe; the polar position of the bend on the pipe; the radius of the bend; and the arc through which the bend is carried. The present invention contemplates a machine in which information relating to a plurality of groups of these four parameters is introduced in coded form, and which operates to form a sequence of bends in the tubing without human intervention using the information source as a control.

The machine includes apparatus for properly positioning the pipe with respect to a stationary bending post. This apparatus includes two clamps which are capable of gripping the pipe. One of these is adapted for movement along the axis of the pipe. The other is adapted to rotate the pipe. They are controlled so as to sequentially grasp the pipe and position it. The bending apparatus includes a series of forms of varying radius which are controlled from the information source so as to place one at a time in operating position. A rotatable wiper roll then presses the pipe against the form and rotates through an arc which is also controlled from the information source. The wiper then retracts and the clamps position the pipe for the next bend on the proper form.

It is therefore seen to be an object of the present invention to provide an automatic machine for forming a series of bends of varying shape in sequence along the length of a tube or rod.

Another object is to provide such a machine which can automatically be adjusted to form bends of a wide variety of size and configuration.

Another object is to provide a machine for forming a sequence of bends in tubing which is controlled from a coded information source which may be simply and quickly changed so as to provide the information for a different series of bends.

A still further object is to provide a machine which is program controlled by electronic equipment of the digital type and which has as its input a punched card.

In one embodiment of the present invention a punched card having holes which carry information relating to the position of a bend on the pipe and the radius and arc of that bend is adapted to be inserted into the control system of the machine. The control system, which utilizes electronic counters, is connected first to the apparatus which moves the pipe in an axial direction, next to the apparatus which rotates the pipe, and finally to the apparatus which bends the pipe through an arc. Other central apparatus positions the proper bending form with respect to the pipe. Motion transducers provide a digital feedback from the moving parts to the electronic controls.

Other advantages, objects and applications of the present invention will be made apparent by the following detailed description of the embodiment of the invention which has been generally described above. This description makes reference to the accompanying drawings in which:

FIGURE 2 is a cross-sectional view of the bending portion of the machine taken along lines 2—2 of FIGURE 1; and FIGURE 3 is a block diagram of the major components of the electronic control system for the machine.

Figure 1:
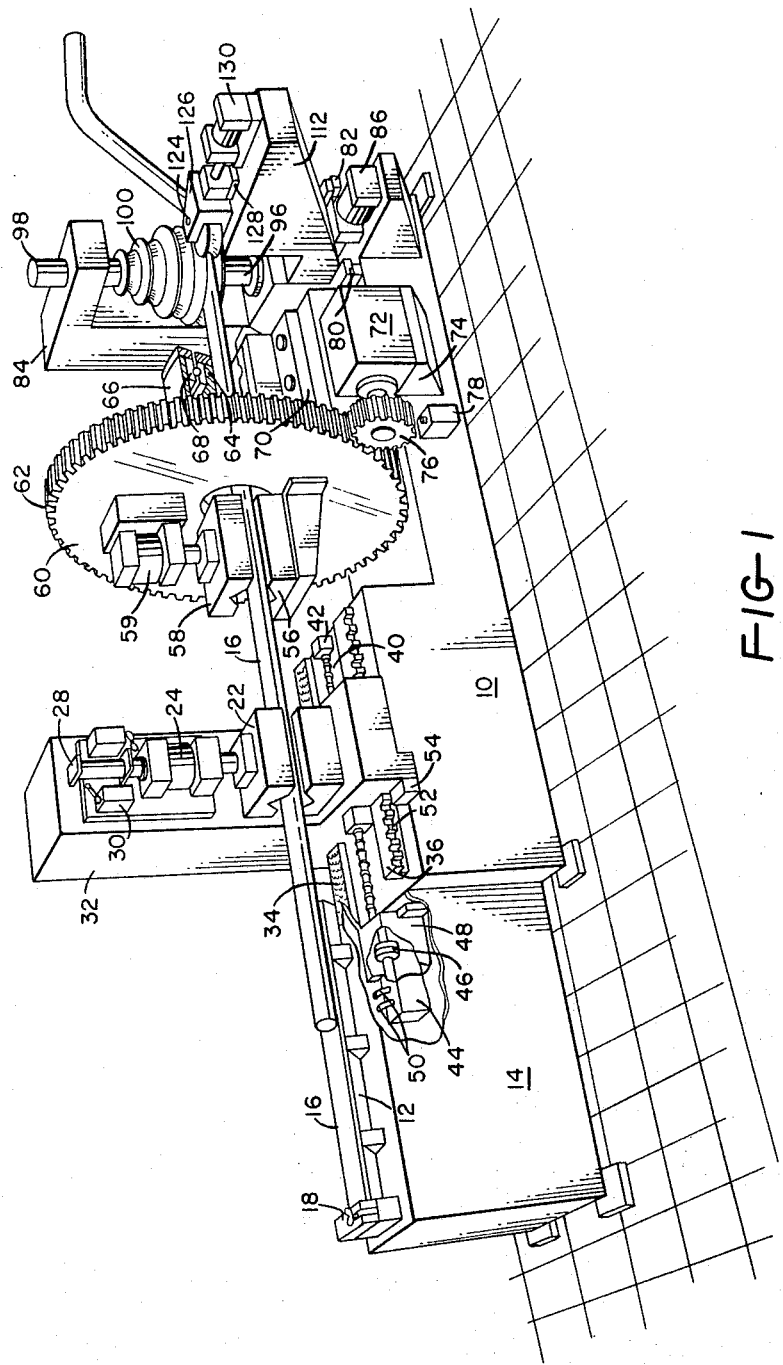
FIGURE 1 is a perspective view of the major portion of the machine.

In FIGURE 1 the machine is illustrated with the hydraulic and electronic control systems removed for simplicity. Where hydraulic lines are shown broken away they connect to the control circuitry of FIGURE 3. The machine is supported on a base 10 which may be welded plate construction. To the left of the machine as shown in FIGURE 1 a pipe support stand 12 which is supported on two legs 14 is adapted to support the pipe 16 as it enters the machine. The support 12 is V-shaped in cross section and has an open top which the pipe lies in. At its extreme end a pivotable stop 18 may be raised into position to close off the end of the support 12.

The support 12 is on a level with the lower, stationary block 20 of a V-clamp which is supported on the machine base 10. The upper, movable V-block 22 is actuated by a hydraulic cylinder 24 which has its rod end connected to the V-block 22. The cylinder 24 is double ended so that its rod 26 extends from its upper end. The rod 26 carries a dog 28 in its extreme end which is adapted to engage the arm of a limit switch 30 so as to provide an electrical signal indicating that the cylinder 24 has reached the end of its stroke and the clamps 20 and 22 are opened.

The cylinder 24 and the limit switch 30 are fixed to the vertical extension of what will be termed the "axial carrier" 32. The carrier 32 is supported on two horizontal hardened and ground gibs 34 and 36. The surface of the carrier 32 which contacts the gibs 34 and 36 is also ground so as to provide a smooth sliding surface between the two. A nut 38 which is affixed to the carrier 32 is disposed between the gibs 34 and 36 and engages an elongated screw 40, having one end rotatably supported in a journal block 42 that is attached to the base 10. The other end of the screw 40 connects to the shaft of a hydraulic motor 44 through a coupling 46. The coupling 46 is housed in a box 48 which also supports the motor 44. Two hydraulic lines 50 extend from the motor 44 and connect to the associated hydraulic circuitry which are shown in FIGURE 3.

The mechanical arrangement is such that when the hydraulic motor 44 is energized and rotates the screw 40, the horizontal carrier 32 is moved along the gibs 34 and 36 as a result of the engagement of the nut 38 with the screw 40.

The outer edge of the gib 36 has a toothed form 52 along its length. As the carrier 32 is moved a proximity pickup 54 emits a signal each time one of the teeth of 52 pass. This provides a digital signal which is utilized by the electronic control equipment to sense the position of the carrier 32 along the gibs in a manner which will subsequently be described.

In other embodiments of the machine the teeth 52 may not be spaced close enough to one another to provide an accurate indication of the position of the slide to the control circuitry. In that event other types of transducers may be employed or auxiliary gearing may be driven from the teeth 52.

The pipe 16 next extends into another pair of V-clamps 56 and 58. The clamp 56, which is stationary with respect to the clamp 58, is supported on a disc 60 which has a series of gear teeth 62 spaced at regular intervals about its perimeter. A hydraulic cylinder 59 powers the movable clamp half 58.

The disc 60 is fixedly attached to a hollow shaft 64, which is shown cut-away in FIGURE 1. The shaft 64 is journaled internally of a hollow cylinder 66 by means of a set of ball bearings 68. The cylinder 66 has a flat base 70 and is supported on the machine 10. A hydraulic motor 72, supported on the machine base 10 by a bracket 74, has a driving gear 76 on its shaft in mesh with the teeth 62 of the disc 60. A second proximity pickup 78 is disposed adjacent to the teeth of the gear 76 to provide a digital signal to the associated electronic control system indicating the angle through which the disc 60 is rotated.

The bending station of the machine (FIGURE 2) is supported on a pair of hardened and ground gibs 80 and 82 for motion in a direction transverse to the axial extension of the pipe 16. The main structure of the bending station is a vertical column 84 which rides on the gibs 80 and 82 and is powered by a hydraulic cylinder 86. The cylinder 86 is positioned on the base 10 and has its rod drivingly connected to the column 84.

A series of four limit switches 88 are fixed to the base 10 in such a position that their arms extend into the area of dogs 90 which are fixed to the moving bending structure 84. The switches 88 are connected to the control circuitry so that one of them is energized, depending upon to what position the bend structure is to be moved. When the arm of that limit switch is tripped by one of the dogs 90 the control circuit operates to halt the flow of fluid to the cylinder 86.

The bending structure 84 carries a central hollow column 92. A cap 94 at the upper end of this column has a vertical aperture which accommodates a splined shaft 96 which is supported at its upper end 98 in the bending structure column 84. The shaft 96 supports a stack of four bending mandrels, 100 of varying radius.

At its lower end the shaft 96 connects to a long screw 102. The screw 102 is powered from a motor 104 which connects by means of a shaft 106 to a drive box 108. The drive box contains bearings and a nut (not shown) which engages the screw 102. Therefore as the motor 104 rotates, the screw 102 is caused to move in an upward or downward direction depending upon the direction of rotation of the hydraulic motor 104.

A group of four limit switches 109 are arranged about the bottom of the screw 102 so as to be tripped by dogs carried on the screw as it moves. They are connected to the same portion of the control circuitry as are limit switches 88 and they operate in the same manner.

A pair of ball bearings 111 and 110 support a rotating bending wing structure 112 in a rotatable manner about the cylinder 92. The rotatable arm 112 carries its own hydraulic motor 114 which connects to a bull gear 116 surrounding the lower end of the cylinder 92 by means of a driving gear 118. As the hydraulic motor 114 is rotated the bending wing 112 is caused to rotate about the cylinder 92.

A third proximity pickup 120 senses the rotation of the gear 118 for the purpose of providing a digital signal to the control system which is indicative of the rotation of the wing 112.

The wing 112 supports a bending roller 122 which is carried on a shaft 124 journaled on a slide 126. This slide 126 is supported on a gib 128 fixed to the arm 112. The slide 126 is powered for motion along the gib 128 by a hydraulic cylinder 130.

Control system

The electronic and hydraulic controls for the preferred embodiment are shown in schematic form in FIGURE 3. It is to be understood that all of the components of the control system are not shown. For purposes of simplicity only the major assemblies have been shown to illustrate their general co-action with one another. The auxiliary devices necessary are not inventive and their nature is obvious to one skilled in the art of such control systems.

The information necessary for the control of the machine is introduced to the system in the form of a punched card 140. The information might also be contained on similar storage media such as punched or magnetic tape.

Each card contains a number of blocks of information equal to the number of bends to be performed on the pipe. A typical block 142 contains four horizontal rows of information coded in binary form. The top line contains only one or two holes which indicate the radius of the bend which is to be performed by the machine. This information is used to control the position of the hydraulic cylinders 86 and 130 through means of the limit switches 88 and 109.

The second line of information from the top of the block contains a number punched in binary form along any or all of ten positions in the line. The absence of a hole indicates a binary zero while the presence of a hole indicates a binary one. The number contained in binary form in this line is a function of the distance through which the pipe is to be moved by the clamps 20 and 22 and the spacing of the teeth 52 on the gib 36. Similarly, the third line from the top indicates the rotary movement which is to be imparted to the pipe by the clamps 56 and 58. Only nine spaces are used for this number while the tenth space indicates the direction of motion of the disc 60. The bottom line similarly contains information which controls the arc through which the rotatable wing 112 moves in performing the bend.

The right hand edge of the card 140 as it is shown in FIGURE 3 is notched to allow it to be moved by a cogwheel 144 into successive positions under a reading head (not shown) which may be of the brush or photoelectric type. The reader picks up the information contained on one line at a time. The reader on the first line of information connects directly to the controls for the limit switches 88 and 109. The lower three lines connect directly to ten binary switching units (flip-flops) 146. These counters are arranged in cascaded form and are connected so that a number from the punched card 140 may be introduced into the counter, and the counter will accept a series of pulses and provide an output signal which can control a relay closure when the number of pulses received is equal to the binary number contained in the counter.

The counter has as its input a line 148 which makes connection to each of the proximity pickups 54, 78, and 120. The output of the counter comprises two lines 150 and 152 both of which connect to a three stage hydraulic valve 154. The line 150 provides a signal from the counter when a number of pulses have been received from the proximity pickup which is equal to the number stored in the counter. At this point the valve 154 is actuated so as to close off the fluid flow to its output.

Previous to this the line 152 provides a signal as the number of pulses received from a proximity pickup approaches the number contained in the counter. This signal shifts the valve 154 to an intermediate position in which its fluid flow is diminished. This decelerates the movement of the motors controlled by the valve 154. In the third position of the valve 154 a full fluid flow is provided at its output.

The valve 154 provides its fluid output to a sequence control valve 156. This valve is connected to the ratchet device 144 which positions particular lines on the card 140 at the reading head. This valve 156 acts to direct the fluid flow received from the valve 154 to one of the three hydraulic motors 44, 72 and 114. These motors are respectively equipped with reversing valves 158, 160 and 162 which receive the flow from the valve 156.

The valve 160 is connected to the reader by a line 75 and is thereby controlled by the last digit in the third line in a bank in such a manner as to control the direction of the movement of the motor 72.

The reversing valves 158, 160 and 162 each also connected to a hydraulic control center 164 which has an input from the hydraulic pump 166 and directs fluid to the various motors to accomplish their return to normal positions. The motors 44 and 114 which control the longitudinal travel of the pipe and the arc through which the bend is accomplished are returned to zero positions after each motion. The hydraulic motor 72 which controls the angle through which the pipe is turned is never returned to its zero position.

The numbers indicating rotation of the disc 60 on a particular card always take the end point of the previous block as their zero point.

Each of the reversing valves 158, 160 and 162 also has a return connection to a sump 168 which provides fluid for the pump 166.

With respect to the control system it should be noted that any of its components may be replaced by other components which perform similar functions. Thus, if a higher degree of accuracy on the various motions is required than can be obtained from a proximity pickup sensing the movement of teeth, this transducer function may be obtained from any of the many types of analog to digital conversion devices which are commercially available. Similarly the entire electronic portion of the control system could operate on a decimal rather than a binary base. A variety of similar control systems which basically compare input data with a feed back signal from the machine's motion and which halt the motion when the two signals are in accord are described in a booklet entitled, "31 Numerically-Controlled Point-to-Point Positioning Systems," published and copyrighted by McGraw-Hill Publishing Co., Inc. Any of these systems could be used in connection with the present invention, providing varying speed and accuracy performances.

Operation

To operate the device the attendant places a length of straight tubing in the support 12 and then lifts the pivotable stop 18 and brings the length of tubing up against it. He then procures a punched card which carries information for the pipe configuration he desires to bend and inserts it in the reader of the machine. The start button is then pressed actuating the cylinder 24 and its clamps 20 and 22 and clamping the pipe in the machine.

At this point the automatic control system takes over operation of the machine and first reads the top line in the first block of information on the punched card 140. This line sets one limit switch in each of the series 88 and 109. Next the hydraulic cylinders 86 and the hydraulic motor 104 are provided with fluid to move the bending structure 84 and the bending forms 100 into position. That position is with the edge of the proper bending form 100 tangent to the pipe 16 as it extends out of the clamps 56 and 58.

After this positioning operation has been accomplished the wheel 144 moves the punched card 140 into position for the second line of the block 142 to be read. This second line contains the number for the motion of the longitudinal slide 32. It is used to place a number in the binary counters 146. Then the hydraulic three stage valve 154 is energized and the sequence control 156 is properly positioned to send a full fluid flow to the hydraulic motor 44 through its reversing valve 158. The proximity pickup 54 detects the motion of the slide 32 past the geared teeth 52 on the gib 36 and sends a series of pulses to the counter 146. These pulses are used to count down the number initially placed in the counter 146 towards zero. As it reaches a point nearing zero, a signal is sent out on line 152 to the valve 154 causing it to shift and diminish the flow to the motor 44, slowing the travel of the slide 32. When the end point is reached a signal on line 150 shuts off the flow from the valve 154 halting the motion of the slide 32. Then the clamps 56 and 58 are actuated by means of the hydraulic cylinder 59. Following this the clamps 20 and 22 are released by motion of the cylinder 24, the end point of which is detected by the limit switch 30. Next the wheel 144 moves the next line on the card 140 into position onto the reader and its number is stored in the counter 146.

The same control which moves the wheel 144 also changes the sequence control valve 156 so as to direct the fluid flow to the hydraulic motor 72 through its reversing valve 160. The fluid flow is then directed through the valves 154 and 160 causing it to energize the motor 72. Again, as a near end point is reached a signal on the line 152 dimnishes the flow to the motors 72 and when the end point is reached a signal on line 150 cuts off the flow to the motor 72.

At this point the pipe is properly positioned for the bending operation. The cylinder 130 is then actuated bringing the wheel 122 into contact with the pipe 16 and clamping the pipe 16 between the wheel 122 and the appropriate bending form 100. While this is occurring the wheel 144 shifts the card 140 to bring the last row of information in the first block under the scrutiny of the reader. Simultaneously, the sequence valve 156 has been shifted to direct the fluid flow to the hydraulic motor 114 through its reversing valve 162. The number contained in the last information line is introduced to the counter 146 and the valve 154 admits fluid to the motor 114 through the valve 156. When a near end point is reached the signal on the line 152 diminishes the flow and soon after that a signal on the line 150 stops the flow.

During these operations the hydraulic control 164 has directed a fluid flow to the motor 44 to cause it to return to its original zero position.

At this point one complete bend has been made on the pipe. The motor 114 is then reversed through the hydraulic control 164 returning the revolving wing 112 to its original position. The wheel 144 then brings the first line in the second block of information under the scrutiny of the reader and the process is repeated. This is continued through each of the blocks of information contained in the card 140, enough to provide complete control for bending the desired pipe. When the machine has completed one pipe it automatically shuts off and the operator removes the finished pipe and inserts a new pipe and a card appropriate for the next pipe to be bent.

When tubing having relatively thin walls and large diameter is used with the present machine it may be found that it will be impossible to bend it through a large arc such as 90 degrees without wrinkling or even collapsing the walls. However, in all situations it is possible to bend a tube through at least a few degrees without collapsing it. Therefore, when such tubing is to be used in the machine it sometimes proves necessary to form bends of a large arc by means of forming a series of small arc bends. Thus, when a 90 degree bend is to be formed and it is determined that such a bend will collapse or wrinkle the tubing it may prove necessary to form the bend by forming a series of smaller bends such as 10 degrees in close proximity to one another.

This may be readily accomplished with the machine by punching the card or other record member so as to form this series of bends. Since it is not necessary to rotate the tube or change the bending form between these incremental bends these functions may be punched in as zeros or the control circuitry may even be modified to ignore them.

By controlling the proximity of the bend segments to one another so that they may be connected by tube sections bent at lesser or greater radius, the radius of the accumulative bend may be adjusted. Thus, assuming a section is formed of smaller, incremental bends of ten degree arc, any radius of bend larger than the bending form may be achieved by connecting these arcs by short unbent sections.

This technique for use of the machine allows the change of the bending forms to be eliminated; although at a sacrifice of machine speed. When it is used a stack of bend forms may be provided which are of the same small radius, but which differ in the diameter of tubing that they accommodate. Thereby, a shift in the bending form may be utilized to automatically convert the machine to a different diameter of tubing.

Having thus described my invention, I claim:

1. A machine for forming a plurality of bends along a length of tubing, comprising: clamping means for said tubing operative to translate said tubing along its axis and rotate it about its axis; a plurality of circular bending forms disposed about a common axis which extends perpendicularly to the direction of translation of said clamping means; means for moving said stack of forms along its axis; a bending wing rotatable about the axis of said forms; means for moving said bending wing toward and away from the axis of said forms in order to capture tubing between the two; a support for said stack of forms and said bending wing movable in a direction perpendicular to both the direction of translation of said clamping means and the extension of the common axis of said forms; a record containing coded information relating to a plurality of bends to be formed along a length of tubing; and a control system operative to establish electrical representations of particular items of information contained on said record and to use said representations to control the position of moving parts of said machines so as to move said stack of bending forms along its axis to position a particular form with respect to said wing, to move said form and wing support so as to position a particular form in operating position with respect to said tubing, to rotate and translate said tubing so as to position a particular point with respect to the bending form so selected, and to move said bending wing through a particular arc.

2. A machine for forming a plurality of bends along a length of tubing, comprising: a stack of circular bending forms disposed about a single axis; a bending wing supported for rotation about the axis of said stack; means for moving said stack along its axis in order to bring a particular one of said bending forms into operating position with respect to said wing; means for moving said wing radially with respect to said stack in order that said length of tubing may be positioned between the two; a support for said stack of forms and said wing movable in a direction perpendicular to the axis of said stack; means for positioning said tubing with respect to said bending wing comprising clamping means adapted to reciprocate along the axis of said tubing in order to move said tubing longitudinally in a single direction and to rotate said tubing about its axis in either direction; means for retaining said tubing in a fixed position while said reciprocating clamping means returns to its initial position; a record containing information relating to a plurality of bends to be formed along the length of tubing, said information comprising the radius of a bend to be formed, the arc of the bend, the length of longitudinal motion of the pipe necessary to position the tubing with respect to said bending wing and the direction and arc of rotation necessary to position the tubing with respect to said bending wing; and a control system operative to establish electrical representations of the items of information contained on said record and to utilize said representations to control the machine so as to form said plurality of bends along said length of tubing.

3. A machine for forming a plurality of bends along a length of tubing, comprising: clamping means for said tubing operative to rotate the tubing about its axis in either direction and to translate it along its axis; a stack of circular bending forms of varying radius disposed about a single axis which extends at right angles with respect to the direction of translation of said clamping means; means for moving said stack along its axis; a bending wing rotatable about the axis of said forms; means for moving said bending wing toward and away from the axis of said forms in order to capture tubing between the two; a support for said bending forms and said wing movable along a line which is perpendicular to both the motion of translation of said clamping means and the axis of said forms; a record containing coded information relating to a plurality of bends which may be performed by said machine, the information for each bend including the distance through which said clamping means must translate the tubing in order to properly position it for a particular bend, the arc and direction of rotation of the clamping means in order to properly position the tubing for such bend, the necessary position of said stack of forms along its axis in order to achieve such bend, and the arc through which the bending wing must be rotated for the bend; and a control system operative to establish electrical representations of particular items of information on said record and to utilize these electrical representations to sequentially control the positions of the movable members of the machine in order to achieve the bends indicated by the record.

4. A machine for forming a plurality of bends along a length of tubing, comprising: clamping means for said tubing operative to rotate the tubing about its axis in either direction and to translate along its axis; a stack of semicircular bending forms of varying radius disposed about a single axis which extends at right angles with respect to the direction of said clamping means; means for moving said stack along its axis; means for moving said tubing along a line which is perpendicular to both the motion of translation of said clamping means and the axis of said form; means for bending said tubing about said form; a record containing coded information relating to a plurality of bends which may be performed by said machine; the information for each bend including the distance through which said clamping means must translate the tubing in order to properly position for a particular bend, the arc and direction of the clamping means in order to properly position the tubing for such bend, the necessary position of the stack of forms along its axis in order to achieve such bend, and the arc through which the bend must be carried; and a control system operative to establish electrical representation of particular items of information on said record and to utilize these electrical representations to sequentially control the positions of the movable members of the machine in order to achieve the bends indicated by the record.

5. A machine for forming a plurality of semi-circular bends of various radius and arc along a length of tubing, comprising: a plurality of circular bending forms of varying radius disposed about a common center; a bending wing adapted for rotation about the center of said forms and for transverse movement with respect to said center; a common support for said bending forms and said wing movable in a direction transverse to the center of said forms; clamping means for said tubing adaptable to rotate said tubing about its axis and move it longitudinally with respect to its axis; and an automatic control system adapted to move a particular one of said bending forms into operating position with said bending wing, move the common support of said bending forms and said wing so as to bring the form so selected into operating relationship with the tubing, operate said clamping means so as to bring a particular point on said tubing into bending position, move said bending wing towards the center of said bending form so as to capture a selected point on the tubing between the bending wing and the selected form, and rotate said bending wing about said selected form through a predetermined arc, the said control system employing a record containing information for each bend indicative of the form to be selected, the point on the pipe to be positioned with respect to the form, and the arc through which the bending wing is to be moved.

6. A machine for forming a plurality of bends of varying radius and arc along a length of tubing, comprising: a stack of circular bending forms of varying radius disposed about a common axis, a bending wire adapted for rotation about the central axis of said stack; power means for moving said stack of forms along its axis; a common support for said bending wing and said form stack movable in a direction transverse to the axis of said stack; a first stationary clamp for said tubing; a second axially movable clamp for said tubing; means for rotating said tubing in either direction about its axis; record means containing information relating to the radius of a plurality of bends, the arcs of each of the bends, the longitudinal motion of the pipe necessary to place it in position for each particular bend, the rotational motion of the pipe necessarry to place it in position for each particular bend, and the directions of rotation of such rotational movements; power means operative to move said stack of forms, said form and wing support, said stationary clamping means, said axially movable clamping means and said means for rotating said tubing about its axis; and control means operative to establish electrical representations of various items of information contained on said record, to establish electrical representations of the motions of said axially movable clamping means, said means for rotating said tubing and said tube bending means, and for powering said various motions until the electrical representations of their motions equal the electrical representations of their motion as indicated by the record.

7. A machine for automatically forming a plurality of semi-circular bends of varying radius and arc along a length of tubing, comprising: a plurality of circular bending forms of various radius; bending means adapted to press said tubing about a section of one of said forms; first clamping means for said tubing movable along the axis of said tubing; second stationary clamping means for said tubing; means for rotating one of said clamping means in either direction about the axis of said tubing; a record containing information concerning a plurality of bends, such information including the radius of each bend, its arc, the longitudinal distance through which the tubing must be moved with respect to a reference point in order to longitudinally position the correct point on the tube for forming the bend, the radial arc through which the tubing must be rotated with respect to a reference plane in order to form the desired bend in the correct plane, and the direction of rotation of such rotary motion; means for establishing electrical representations of the information contained on said records; means for powering said bending means and said clamping means; means for establishing electrical representations of the motions of said clamping means and said bending means; means for comparing the electrical representation of a particular item of information with the electrical representation of a particular motion; and control means for said power means operative to terminate the motion of a particular component at such time as the electrical representation of its motion is equal to the electrical representation of an item of information indicating its desired motion.

8. A machine for forming a plurality of partially circular bends of various arcs along a length of tubing, comprising: bending means operative to form circular bends in pipes, said bending means being controllable as to the radius of the bend and to the arc of bend; positioning means adapted to rotate said tubing about its axis in either direction and to move said tubing longitudinally; a record containing information necessary for forming a plurality of diverse bends along the length of said tubing, the information for each bend comprising its radius and its arc, the longitudinal distance of a particular point on the bend from a reference point on the pipe, the angle formed between the plane of the bend to be formed and a particular plane of reference with respect to the axis of said tubing, and the direction, clockwise or counter-clockwise, of such angle; and a control system operative to establish electrical representations of the information contained on the record, to actuate the movement of the tube positioning means and the tube bending means, to establish electrical representations indicative of the movement of the tube position means and the tube bending means, and to terminate the movement of the various components of the tube positioning means and the tube bending means when the respective electrical representations of their movements are equal to the electrical representations of a particular segment of information contained on said record.

9. A machine for forming a plurality of bends along a length of tubing comprising: clamping means for said tubing adapted to rotate said tubing about its axis and translate it along its axis; a plurality of circular bending forms disposed about a common axis; power means for forming a semi-circular bend in said tubing about a particular one of said bending forms; a record containing information relating to a plurality of bends to be formed along said tubing, the information for each bend including a first number indicative of the radius of the bend to be formed, a second number indicative of the arc of the bend to be formed, a third number indicative of the necessary motion of the tubing along its axis with respect to a reference point to position it with respect to a particular bending form, a fourth number indicative of the arc of rotation with respect to the previous position of the tubing necessary to position a point on said tubing with respect to a particular one of said bending forms, and a fifth number indicative of the direction of the rotation necessary to achieve the proper position of the tubing with respect to said particular form; and a control system operative to establish electrical representations of particular items of information on said record, and to utilize such representations to control said machine so as to position a particular one of said bending forms in operating relationship to the other components of the machine, to translate and rotate said tubing so as to position a particular point on said tubing with respect to the bending form so selected and to bend the tubing through the desired arc, thereby sequentially forming each of the bends indicated by said record.

10. A machine for forming a plurality of bends along a length of tubing, comprising: clamping means for said tubing operative to translate said tubing along its axis; a stack of semi-circular bending forms of varying radius disposed about a single axis which extends at right angles with respect to the direction of motion of said clamping means; means for moving said stack along its axis; means for moving said tubing along a line which is perpendicular to both the motion of translation of said clamping means and the axis of said forms; means for bending said tubing about said forms; a record containing coded information relating to a plurality of bends which may be performed by said machine, the information for each bend including the distance through which said clamping means must translate the tubing in order to properly position for a particular bend, the necessary position of the stack of forms along its axis in order to achieve such bend, and the arc through which the bend must be carried; and a control system operative to establish electrical representations of particular items of information on said record and to utilize these electrical representations to sequentially control the positions of the movable members of the machine in order to achieve the bends indicated by the record.

11. A machine for forming a plurality of bends along a length of tubing or rod, comprising: clamping means for said tubing or rod operative to translate it along its axis; a stack of bending forms of varying configuration disposed about a single axis which extends at right angles with respect to the direction of translation of said clamping means; means for moving said stack along its axis; means for moving said forms along a line which is perpendicular to both the motion of translation of said clamping means and the axis of said forms; means for bending said tubing about said forms, a record containing coded information relating to a plurality of bends which may be performed by said machine, the information for each bend including the distance through which said clamping means must translate the tubing in order to properly position for a particular bend, the arc and direction of rotation of the clamping means in order to properly position the tubing for such bend, the necessary position of the stack of forms along its axis in order to achieve such bend, and the length through which the bend must be carried; and a control system operative to establish electrical representations of various items of information on said record and to utilize these electrical representations to sequentially control the positions of the movable members of the machine in order to achieve the bends indicated by the record.

12. A machine for forming a plurality of bends along a length of tubing comprising: a first clamp for said tubing adapted for movement along the axis of said tubing; a second clamp for said tubing adapted for rotational motion about the axis of said tubing; a plurality of semi-circular bending forms disposed about a common axis; a bending wing adapted for rotation about the axis of said forms; and an automatic sequential control which includes means for positioning a particular one of said bending forms in an operating position with respect to said bending wing, means for powering said first clamp and moving it through a predetermined distance, means for powering said second clamp and rotating it through a predetermined arc, and means for powering said bending wing and moving it through a predetermined arc, whereby said control operates the machine to automatically position a particular bending form in operating position, then operates said first and second clamps to position a particular point on said pipe with an operating position with respect to the bending form so selected and then powers said bending means so as to form a bend of a particular radius and arc at the point so selected, such operations being automatically performed repeatedly so as to form a plurality of bends of varying configuration.

13. A machine for forming a plurality of bends of varying arc along a length of an elongated member, comprising: bending means operative to form bends in said member, said bending means being controllable as to the arc of the bend; positioning means adapted to move said member longitudinally; means for supplying digital coded information necessary for forming a plurality of diverse bends along the length of said member, the information including the arc of the bend and the longitudinal distance of a particular point on the bend from a reference point on the member; and a control system operative to establish electrical representations of the information to actuate the movement of the member positioning means and the member bending means, to establish electrical representations indicative of the movement of the member positioning means and the member bending means and to terminate the movement of the various components of the member positioning means and the member bending means when the respective electrical representations of their movements are equal to the electrical representations of a particular segment of information.

14. A machine for forming bends in an elongated member comprising: first motor means for moving an elongated member in a direction along its longitudinal axis, second motor means for selectively rotating the member about its longitudinal axis, third motor means for bending a portion of the member through an arc, a digital information source containing a set of coded information relating to the location of a bend, the plane of a bend and the arc of a bend to be effected on the member, and electro-mechanical means including circuitry structurally interrelating said information source with said first, second and third means to automatically sequentially cause the first means to move the member to position a predetermined location on the member in a predetermined plane effected by said second means so that said third means bends the member at said location through a predetermined arc in response to the coded information of said information source.

15. A machine for forming bends in an elongated member comprising first motor means for moving an elongated member in a direction corresponding to its longitudinal axis, second motor means for rotating the tubular member about its longitudinal axis, third motor means for bending the elongated member through a predetermined arc, a digital information source containing a set of digital coded information providing the location of a bend, the plane of a bend, and the arc of a bend to be effected on the elongated member, reading means associated with said information source, and electrical means including circuitry structurally interrelating said reading means with said first, second and third means to automatically sequentially cause the first means to move the elongated member to position a predetermined location on the member in a predetermined plane effected by said second means so that said third means bends the elongated member at said location through a predetermined arc in response to the coded information sensed by said reading means.

References Cited by the Examiner

UNITED STATES PATENTS

| | | | |
|---|---|---|---|
| 78,418 | 6/1868 | Boyd | 153—46 |
| 81,902 | 9/1868 | Heckart | 153—46 |
| 828,338 | 8/1906 | Reynolds | 153—4.5 |
| 2,306,224 | 12/1942 | Parker et al. | 153—40 |
| 2,382,745 | 8/1945 | Powers | 153—40 |
| 2,391,252 | 12/1945 | Louthan | 153—46 X |
| 2,430,217 | 11/1947 | Eastes | 153—48 |
| 2,741,732 | 4/1956 | Cunningham. | |
| 2,838,963 | 7/1958 | Good et al. | |

CHARLES W. LANHAM, *Primary Examiner.*

WILLIAM F. PURDY, WHITMORE A. WILTZ, WILLIAM J. STEPHENSON, *Examiners.*

F. McMULLEN, G. L. MILHOLLIN, R. D. GREFE, *Assistant Examiners.*